US005172773A

United States Patent [19]

Meister et al.

[11] Patent Number: 5,172,773

[45] Date of Patent: Dec. 22, 1992

[54] POWER CORD DIVERTER AND SUSPENSION CLAMP FOR A POWER TOOL

[75] Inventors: Ronald J. Meister, Athens, Pa.; David J. Ropp, Flemington, N.J.

[73] Assignee: Ingersoll-Rand Company, Woodcliff Lake, N.J.

[21] Appl. No.: 838,952

[22] Filed: Feb. 21, 1992

Related U.S. Application Data

[62] Division of Ser. No. 685,572, Apr. 15, 1991.

[51] Int. Cl.[5] ..... B23B 45/02

[52] U.S. Cl. ..... 173/170

[58] Field of Search ..... 173/170, 168, 169

[56] References Cited

U.S. PATENT DOCUMENTS

| | | | |
|---|---|---|---|
| 1,949,482 | 3/1934 | Libertini | 173/170 |
| 2,037,890 | 4/1936 | Dow | 173/170 |
| 2,053,720 | 9/1936 | Huck | 173/170 |
| 2,617,971 | 11/1952 | Stack | 173/170 |
| 2,729,198 | 1/1956 | Faccou | 173/170 |
| 2,876,369 | 3/1959 | Doerner | 173/170 |
| 3,400,361 | 9/1968 | Okun | 173/170 |
| 3,530,577 | 9/1970 | Franklin et al. | 173/170 |

*Primary Examiner*—Douglas D. Watts
*Assistant Examiner*—Scott A. Smith
*Attorney, Agent, or Firm*—Robert F. Palermo

[57] ABSTRACT

A power tool is provided with a rigid power cord diverter which covers and shields the cord and which guides the cord from the power inlet of the tool to a remote location on the tool. The power diverter is firmly clamped to the power cord so that it is possible for the power cord to support the weight of the tool at the remote location. In some configurations, the power cord diverter conduit cover serves as a trigger guard or hand guard on the tool grip.

2 Claims, 4 Drawing Sheets

POWER CORD DIVERTER AND SUSPENSION CLAMP FOR A POWER TOOL

This is a division of application Ser. No. 07/685,572 filed Apr. 15, 1991.

BACKGROUND OF THE INVENTION

This invention relates generally to power tools and more particularly to hand held power tools which offer a selection of power inlet locations.

Hand held power tools commonly have power inlets at the end of or bottom of the hand grip. This is primarily because the operating trigger is also in the handle and the tool power must necessarily pass through the trigger or switch. For tools which are used occasionally and for only brief time periods, the location of the power inlet is not a significant consideration. However, when used in industrial assembly operations or other relatively continuous operations, the weight and balance of the tool can be adversely effected by an inappropriately located hose or cord. In long term usage, this imbalance and increased weight can detract from operator comfort and convenience, thereby decreasing the quality and quantity of the operator's work output.

In addition, the inlet location in the handle bottom or end virtually assures that the power cord or air hose will trail on the floor where it is subject to damage and, further, presents, a tripping hazard.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is provided by a hand held electric power tool in which the power cord enters the tool housing at the end of the handle and which has a power cord diverter for shielding the power cord and for guiding it from the end of the handle to a remote location on the tool housing, and a mechanism for connecting the cord diverter to the power inlet and for clamping the cord within the diverter at the remote location.

The foregoing and other aspects will become apparent from the following detailed description of the invention when considered in conjunction with the accompanying drawing figures.

Figure 5:
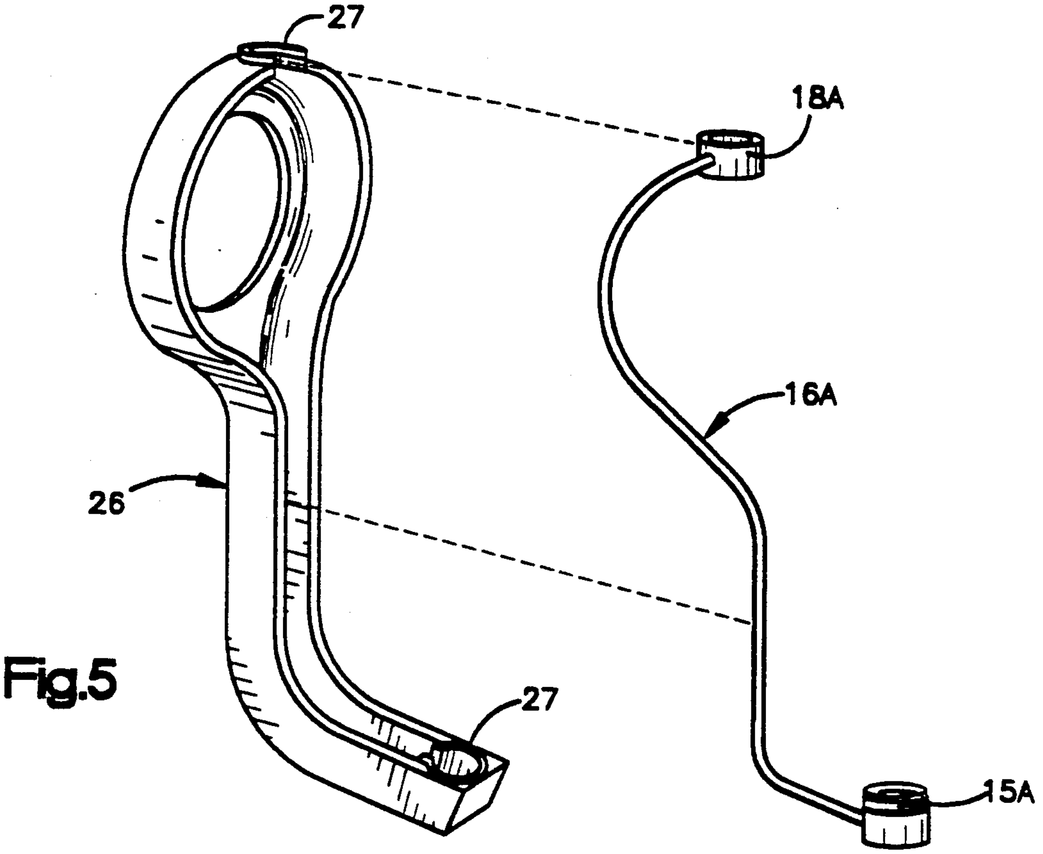
FIG. 5 is an alternative embodiment of the present invention.
Figure 6:
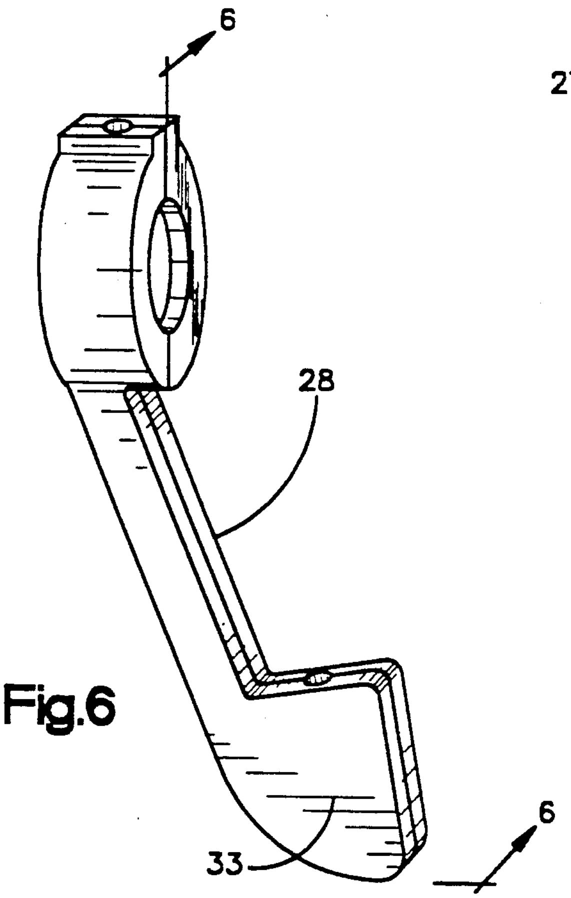
Figure 7:
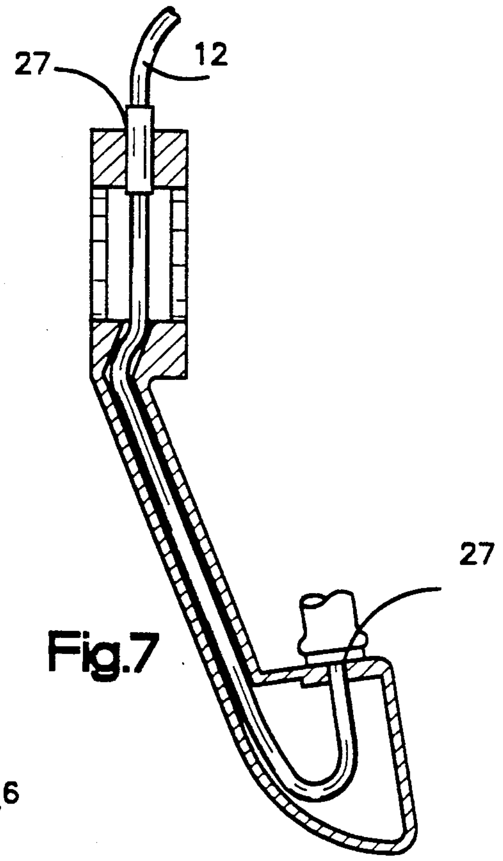
Figure 8:
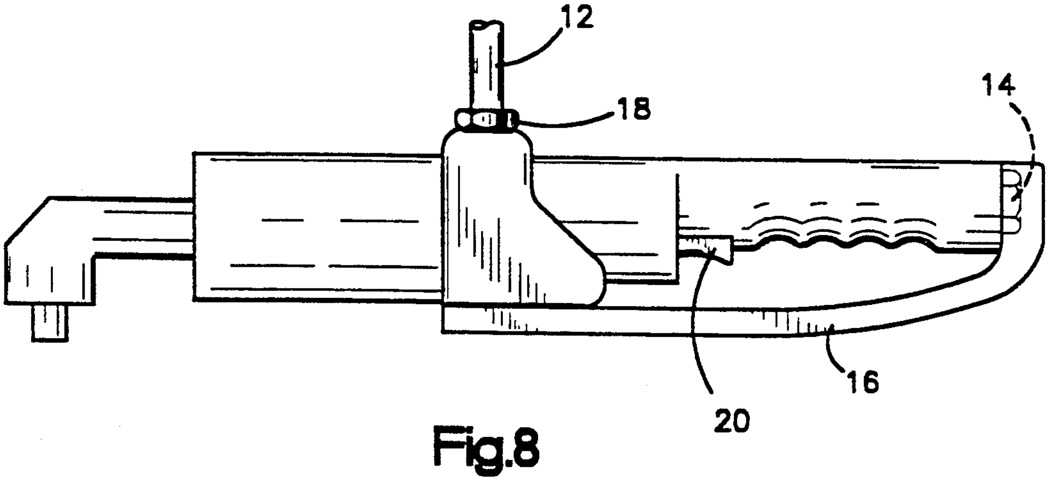
Figure 9:
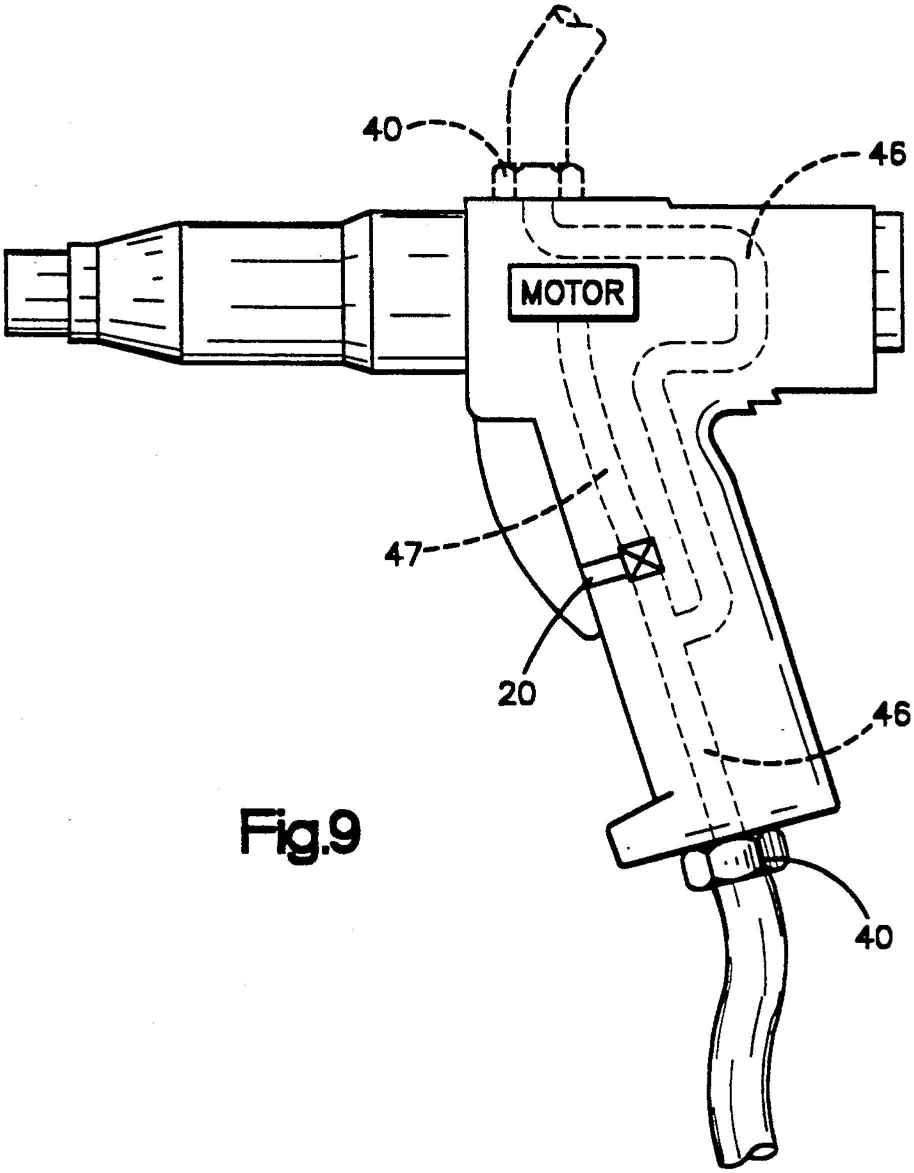
Figure 10:
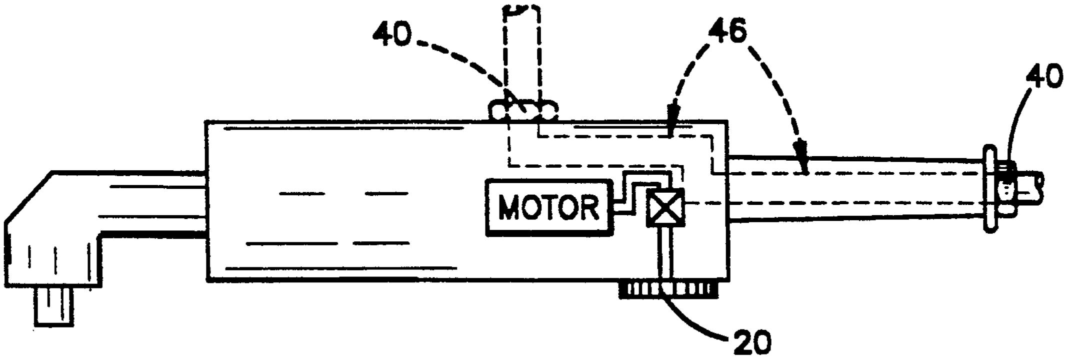

FIG. **5*a* is a further variant of the embodiment of FIG. 5**;

FIG. 6 is another embodiment of the present invention;

FIG. 7 is the embodiment of FIG. 6 viewed from the split line;

FIG. 8 is a schematic illustration of the invention applied to a straight handled power tool;

FIG. 9 is a schematic illustration of the present invention internally applied to a pistol style power tool; and FIG. 10 is a schematic illustration of the present invention as shown in FIG. 9, this time applied to a straight handled power tool.

DETAILED DESCRIPTION

Figure 1:
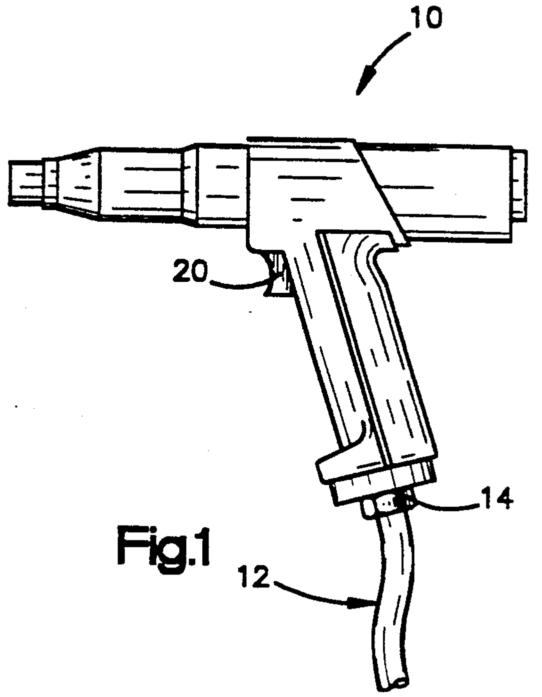
FIG. 1 is a schematic illustration of a typical pistol style power tool.

FIG. 1 shows a typical pistol style power tool 10 having a power inlet at the end of its handle where power supply line 12 connects with the tool. It also has a power switch 20, or trigger. This is typical of off the shelf pistol style power hand tools which are currently available.

Figure 2:
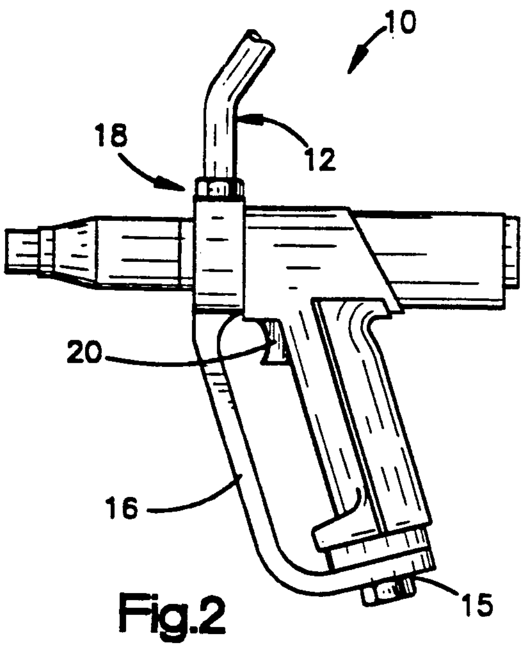
FIG. 2 is an illustration of the tool of FIG. 1 incorporating the present invention.

FIG. 2 shows the tool of FIG. 1 incorporating the present invention. The geometry of the tool 10 is unchanged in that power switch 20 and power inlet 14 are still located on the pistol handle. In this case, however, power supply line 12 is connected at remote power inlet 18 shown at the top of the tool. Power conduit 16 provides a power path from remote power inlet 18 to power inlet 14. In addition, power conduit 16 serves as a trigger guard and hand guard for the operator. When connected to the remote power inlet 18, and when properly counterbalanced, power supply line 12 can bear most of the weight of the tool. This, coupled with balancing of the tool in its operating position, markedly reduces operator fatigue and thereby permits a sustained high level of operator comfort, convenience, and efficiency.

Figure 3:
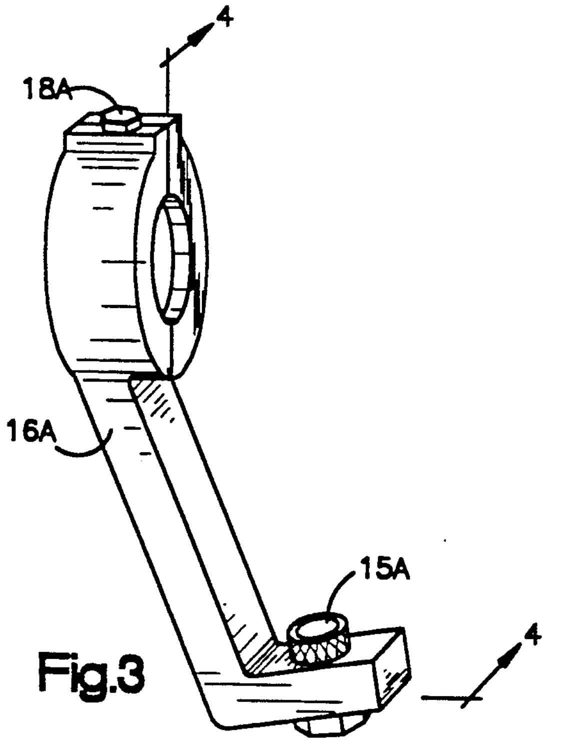
FIG. 3 is a schematic illustration of the preferred embodiment of the present invention.
Figure 4:
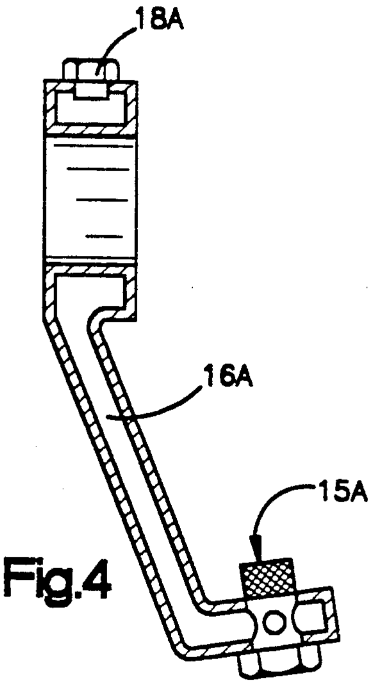
FIG. 4 is a sectional view from line 4—4 of FIG. 3.

FIGS. 3 and 4 show further detail of the preferred embodiment of the present invention. In this instance a pneumatic embodiment is illustrated. In these figures, air from the power supply line (not shown) enters remote power inlet **18*a*, travels through the annular passage and down the hand guard passage of pneumatic power conduit 16*a*. At the end of that path, the power air enters the tool through pneumatic power inlet adapter 15*a* which connects to power inlet 14** shown in FIG. 2. When properly installed on the tool, this device permits suspension of the tool in its operating position from an overhead hose reel. This eliminates the operator fatigue associated with tool weight and the restricted mobility of the operator due to tool weight, improper tool balance, and the need to avoid stepping on the portion of the hose lying on the floor.

Figure 5A:
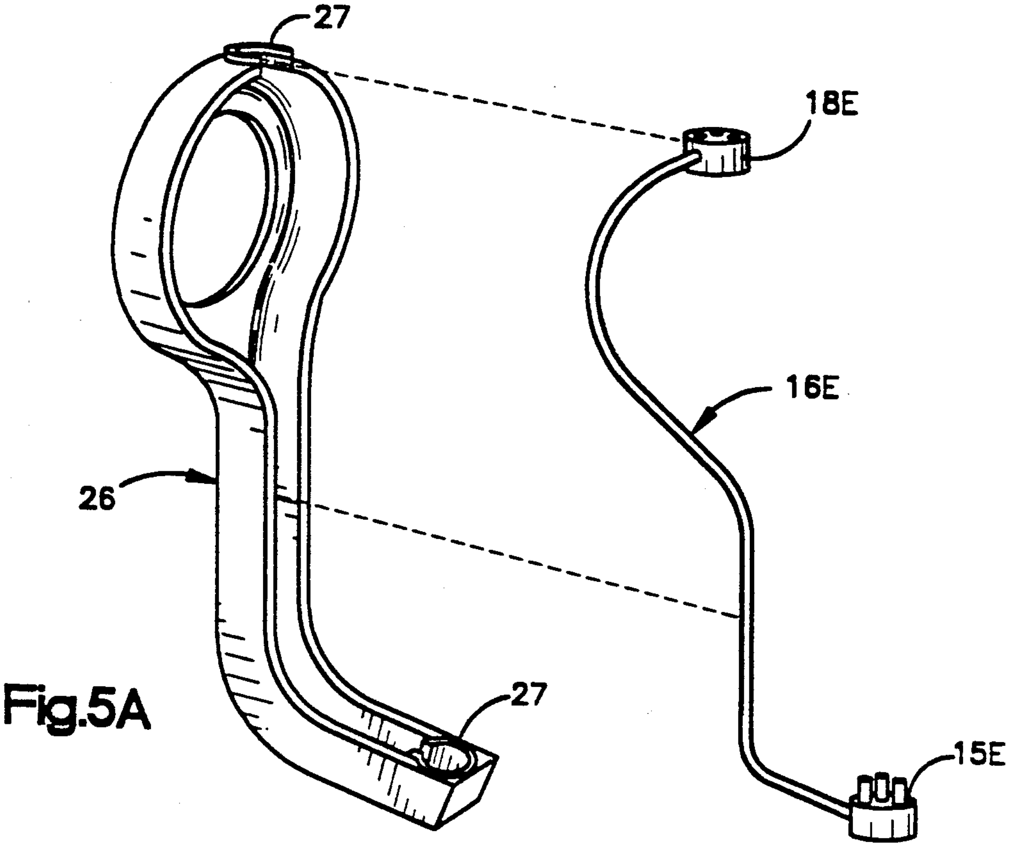

FIGS. 5 and **5*a* illustrate pneumatic and electric versions, respectively, of another embodiment of the present invention. In FIG. 5, pneumatic power (or compressed air) enters through remote pneumatic power inlet 18*a*, travels through pneumatic conduit 16*a* to pneumatic power inlet adapter 15*a*. This is exactly analogous to the embodiment discussed with respect to FIGS. 3 and 4. Rigid formed conduit cover 26, equipped with grip fittings 27 at the top and bottom extremes of the cover fits closely over pneumatic conduit 16*a*. Grip fittings 27 secure pneumatic remote power inlet 18*a* and pneumatic power inlet adapter 15*a* to conduit cover 26 in order to provide the mechanical strength necessary for suspension of the tool from the overhead air hose. In FIG. 5*a*, remote electrical power inlet 18*e* is connected through electric power conduit 16*e* to electric power inlet adapter 15*e* in an analogous manner to the pneumatic embodiment of FIG. 5. Remote power inlet 18*e* and power inlet adapter 15*e*** are of commonly available locking connector design. This permits suspension of the tool weight from an overhead cable reel in the same way as described for the pneumatic embodiment.

FIGS. 6 and 7 illustrate an embodiment designed to accommodate retrofit of existing electrical tools. In this case, split electric conduit cover 28 is very similar to pneumatic power conduit 16a illustrated in FIGS. 3 and 4. In order to permit installation of conduit cover 28 over an existing permanently attached power supply line 12, conduit cover 28 is split so that its two lateral halves are separable. When installed, the two halves join to securely grip the tool housing and to simultaneously securely grip the power supply line 12 (or power cord) in grip fittings 27. In addition, conduit loop radius 33 is provided in conduit cover 28 at the bottom to allow a smooth bend of power supply line 12 to avoid kinking. Grip fittings 27 are again included to provide tool suspension capability. As shown, the conduit cover 28 (or power cord diverter) serves as a hand guard or trigger guard on a pistol grip tool. Grip fittings 27 securely clamp power line 12 (or power cord) at both the remote location on the tool housing and at the power inlet location.

FIG. 8 shows a straight handled power tool equipped with another embodiment of the present invention. In this case, the functions of all parts of the invention are identical to those already discussed. Power supply line 12 is attached to remote power inlet 18 and supplies power through power conduit 16 and power inlet adapter (not shown) to power inlet 14 shown in phantom. In this embodiment also, power conduit 16 is configured to serve as a trigger guard and hand guard.

FIG. 9 schematically illustrates a tool having two power inlets together with internally provided power conduits extending from those inlets to the power switch. In use, a power supply line (not shown) would be connected to either power inlet 40, while unused power inlet 40 would be plugged or otherwise capped. Power is transmitted through internal power conduits 46 to power switch 20 and from there to the motor through power link 47. Regardless of which power inlet 40 is used, the power must pass through switch 20 and enter the motor through power link 47.

FIG. 10 shows a straight handle tool embodying the internal power conduits discussed with respect to FIG. 9. In all respects other than shape, these two applications are identical. Moreover, the embodiments of FIG. 9 and FIG. 10 may be provided as electrical or pneumatic embodiments in the same way as described with respect to FIGS. 3 through 6. Hence, except for differences in shape and the provision of internal or external power conduits, both pneumatic and electrical adaptations of both embodiments are possible.

In summary, the present invention addresses the ergonomics of sustained use of hand held power tools in industrial assembly environments. It provides for selectability of power inlet location on the power tool in order to permit suspension of the tool weight, optimization of tool balance, and avoidance of power supply lines lying on the floor in the work area. Thus, this invention provides the advantage of permitting power introduction at the top of the tool when the tool is in its operating position rather than as constrained by tool geometry.

What is claimed is:

1. In a hand held electric power tool of the type having a housing body with a handle in which an electric power cord enters at an end of the tool handle, the improvement comprising:

a releasable attachment means attachable to said housing body for diverting the power cord from the end of the tool handle to a desired remote location upon the tool body and for shielding the cord from mechanical damage along the entire length of cord extending between said remote location and said end of the tool handle; and means for clamping the power cord at the desired remote location, wherein the attachment means comprises a rigid conduit cover separable into two mating lateral halves, having a smooth internal loop radius for forming a gradual bend in said cord near the point where the cord enters the tool handle, and having a configuration suitable for a trigger grip guard.

2. The improvement of claim 1, wherein the means for clamping the power cord comprises a grip fitting having sufficient clamping force to permit suspension, at the remote location, of the tool by said power cord.

* * * * *